March 27, 1951  G. J. HARMAN  2,546,892
RECEPTACLE AND CLOSURE THEREFOR FOR
AIRCRAFT REFUELING APPARATUS
Filed Nov. 29, 1946  3 Sheets-Sheet 2
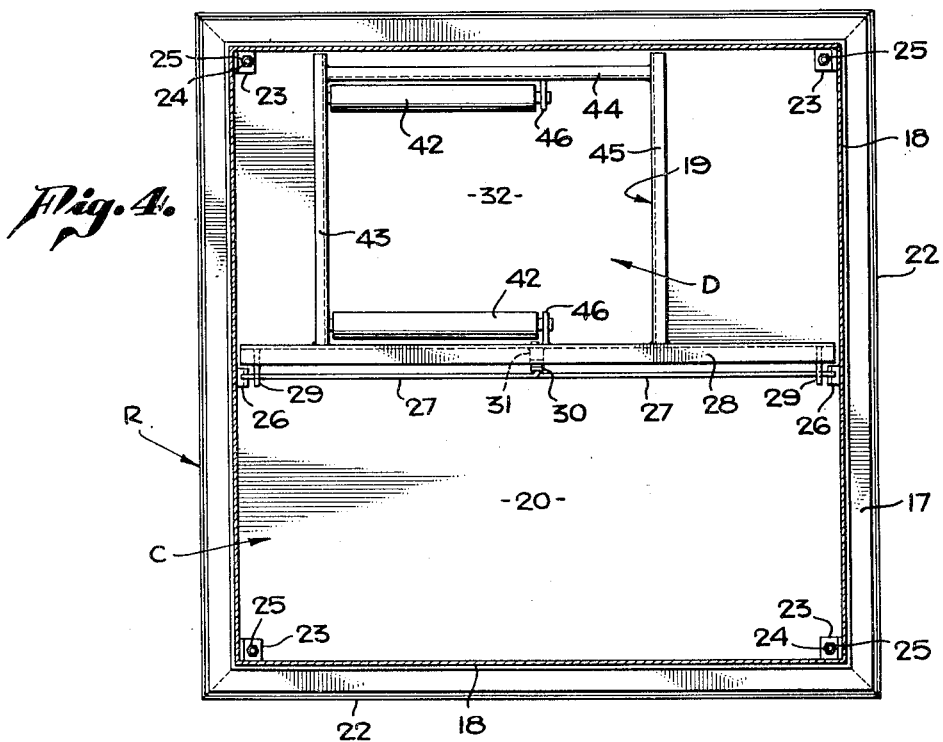
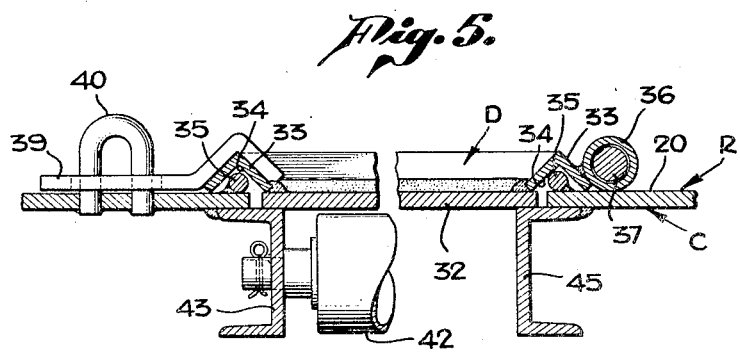
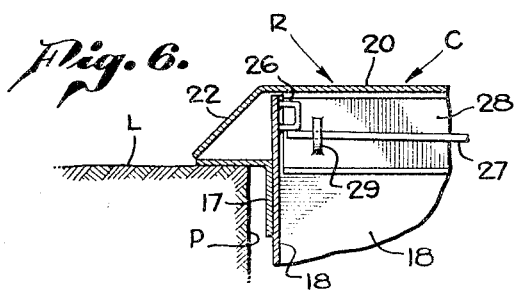
INVENTOR.
Gerald J. Harman
BY
ATTORNEY

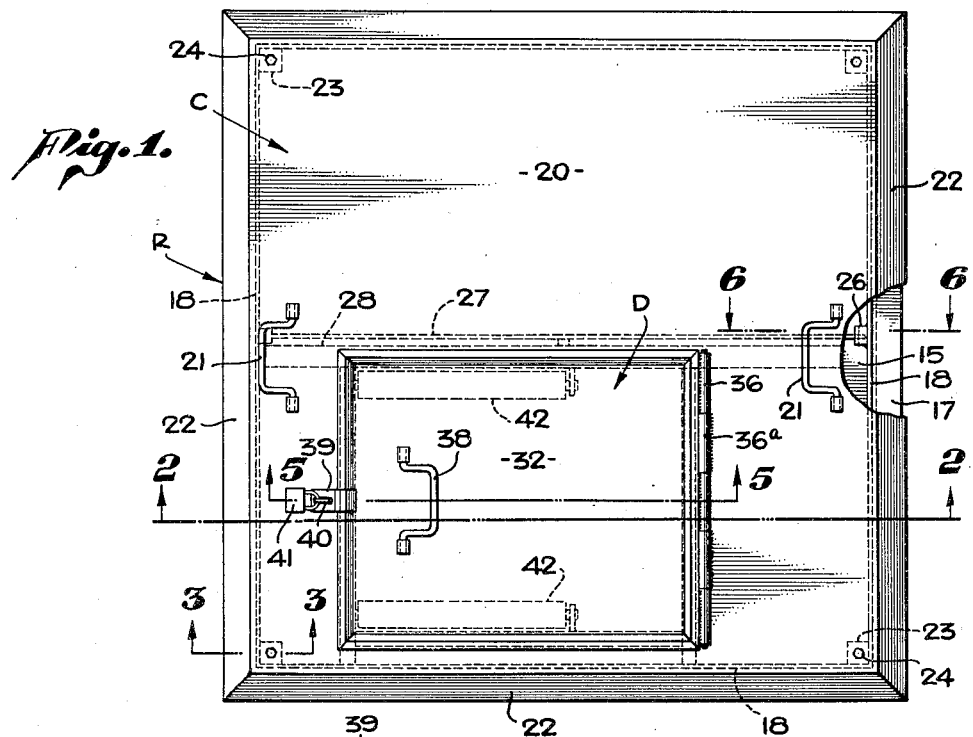
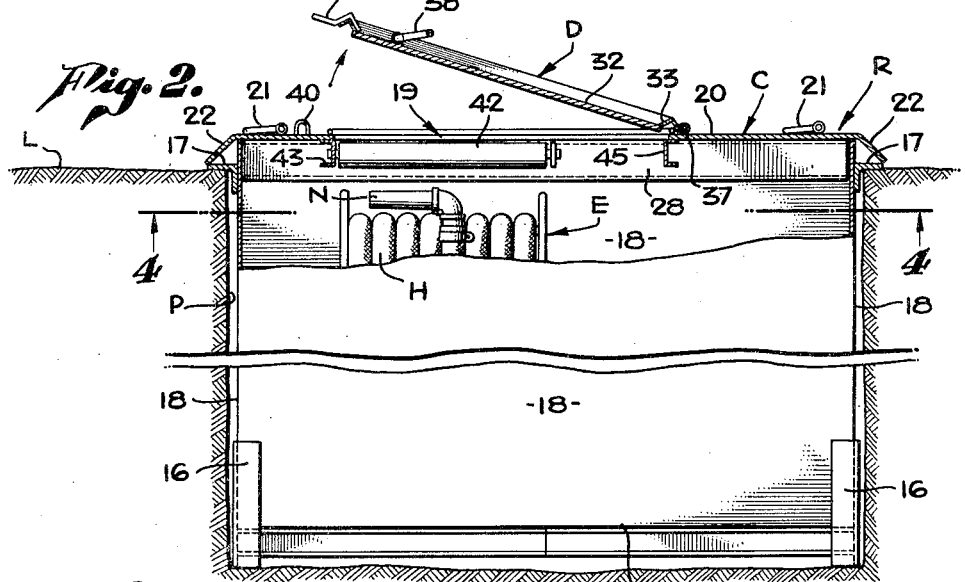
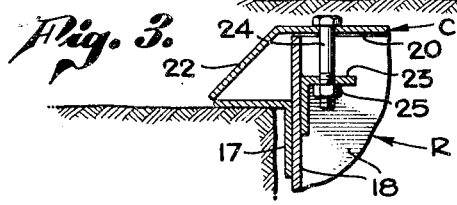

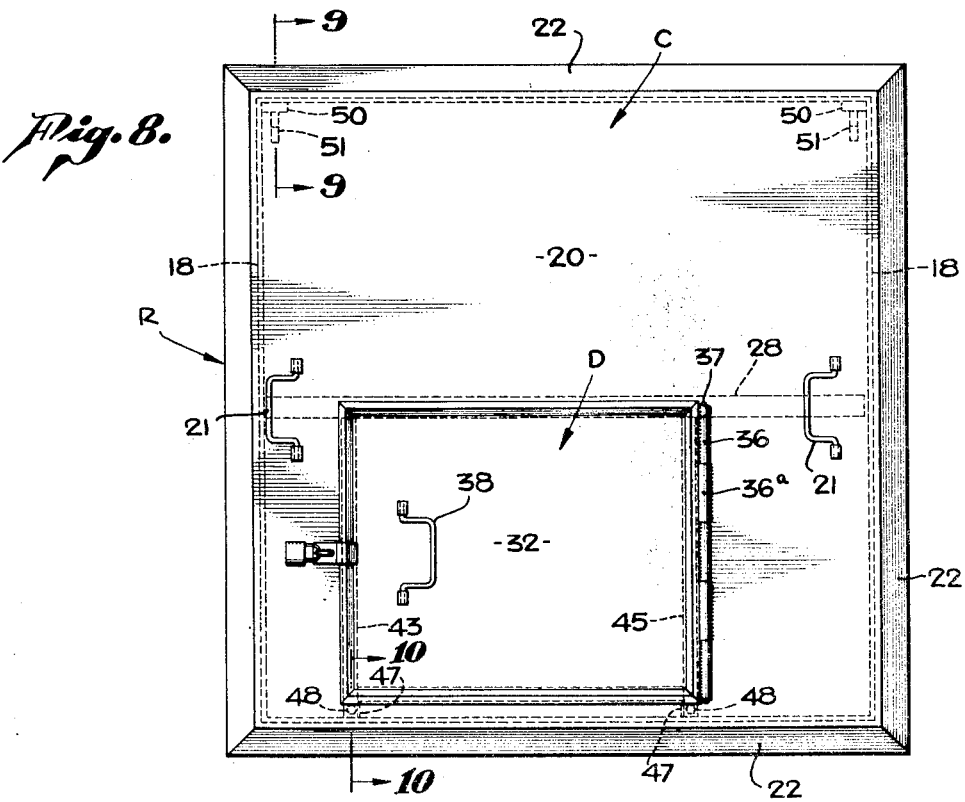

Patented Mar. 27, 1951

2,546,892

UNITED STATES PATENT OFFICE 2,546,892

RECEPTACLE AND CLOSURE THEREFOR FOR AIRCRAFT REFUELING APPARATUS

Gerald J. Harman, Los Angeles, Calif.

Application November 29, 1946, Serial No. 713,132

2 Claims. (Cl. 220—18)

My invention relates to aircraft refueling apparatus of that type situated in a pit in a landing field, and encased in a box-like housing or receptacle having a hinged cover which, by opening, access is had to a hose to extend it from the receptacle to the aircraft for supplying fuel to the latter. Inasmuch as the receptacle cover when closed is flush with the surface of the landing field so that grounded aircraft may pass thereover, it must be constructed of heavy gage metal or adequately reinforced to prevent it collapsing under the weight of the aircraft. In consequence, the cover is of such weight as to render it extremely difficult for anyone to lift it to open position, as well as to lower it to closed position which should be done to prevent distortion thereof or its hinge mounting, should it be permitted to fall to closed position.

It is a purpose of my invention to provide a closure for the top of such a receptacle which embodies a cover having a door therein which is relatively light, and thus can easily be lifted to open position to extend the fuel hose therefrom for refueling of aircraft, and thereby avoiding lifting of the entire cover as aforedescribed.

It is also a purpose of my invention to provide a receptacle closure in which the cover is not an integral part of the receptacle, but is detachably secured thereto in order to both initially install and subsequently gain access to the parts of the apparatus for purposes of repair. To prevent surreptitious access to the apparatus the means for detachably securing the cover to the receptacle, is accessible at least in part to release the cover only through opening of the door which is normally locked in closed position.

A further purpose of my invention is the provision of a receptacle closure in which the structures of the cover and the door are such as to close the receptacle against the entrance of water, snow, dust, and the like, and thus protect the apparatus against the detrimental action thereof.

I will describe only one form of receptacle and a closure therefor, and two forms of cover securing means, all embodying my invention, and will then point out the novel features thereof in claims.

In the accompanying drawing:

Fig. 1 is a view showing in top plan one form of receptacle for aircraft refueling apparatus, and one form of closure therefor, each embodying my invention.

Fig. 2 is a view showing the receptacle in side elevation and partly in section, the section being taken on the line 2—2 of Fig. 1.

Fig. 3 is an enlarged fragmentary vertical sectional view taken on the line 3—3 of Fig. 1.

Fig. 4 is a horizontal sectional view taken on the line 4—4 of Fig. 2.

Fig. 5 is an enlarged sectional view taken on the line 5—5 of Fig. 1.

Fig. 6 is an enlarged sectional view taken on the line 6—6 of Fig. 1.

Fig. 7 is a fragmentary vertical sectional view taken on the line 7—7 of Fig. 4.

Fig. 8 is a view similar to Fig. 1, showing another form of receptacle and closure embodying my invention.

Fig. 9 is an enlarged fragmentary vertical sectional view taken on the line 9—9 of Fig. 8.

Fig. 10 is an enlarged fragmentary vertical sectional view taken on the line 10—10 of Fig. 8.

With specific reference to the drawings, and to the form of my invention shown in Figs. 1 to 7, the receptacle is indicated generally at R and is situated in a pit P in a landing field L for aircraft. Where the pit is of square form the receptacle is of similar form so as to fit therein with its open top extending only a short distance above the surface of the landing field, as shown in Fig. 2.

It is within the receptacle that the parts of the apparatus necessary for refueling aircraft are contained, but the only part with which my invention is concerned is a reel E upon which a hose H is mounted to be unwound therefrom and extended from the top of the receptacle to position a discharge nozzle N within the fuel tank of the aircraft.

The receptacle R is constructed of suitable gage metal and has a bottom wall 15 supported in elevated position at the bottom of the pit P, by corner legs 16 in the form of angle bars welded or otherwise secured to the receptacle (see Fig. 2). Spacing and sealing elements 17 in the form of angle bars are secured to the outer walls of the four sides 18 of the receptacle to rest on the landing field surface and thus close the gap between the receptacle and the walls of the pit so as to prevent the entrance of water and snow therebetween and thereby protect the metal receptacle against resultant rusting.

The closure for the top of the receptacle R includes a cover C and a door D which normally closes an entrance opening 19 situated in the cover directly above the hose reel E so that by opening the door access may be had to the hose H for extension thereof to the aircraft.

The cover C which comprises a metal plate 20 of an area to completely close the top of the receptacle R, must be sufficiently strong to support, without breaking or bending, the weight of a grounded aircraft rolling thereof. Consequently, the cover is of considerable weight and difficult to remove, and hence, should not be removed each time it is required to use the hose H, but only when wanting to gain access to the other working parts of the refueling apparatus for purposes of repair and substitution. To attain this advantage the door D has been provided. Pivoted handles 21 are provided on the cover to facilitate application and removal of the cover.

The cover C when in place rests on the upper edges of the receptacle, while marginal flanges 22 on the plate 20 downturned at a suitable angle, rest at their outer edges on the angle bars 17 (see Fig. 2). Thus two points of sealing are provided against the entrance into the receptacle of water, snow, and dust to protect the refueling apparatus.

To prevent surreptitious removal of the cover C, securing means is provided which has parts accessible from the outer side of the cover, and other parts only accessible through opening of the door, and which control the final release of the cover. In the present instance the parts of the securing means accessible from the exterior of the cover, comprise angle members 23 secured in the inner corners of the receptacle R, and bolts 24 extending through the cover and the members, and provided with nuts 25 on their lower ends (see Fig. 3).

Those parts of the securing means accessible through the door D, are on the inner side of the cover and receptacle, and comprise a latching means which may be made up of two keepers 26 in the form of channel bars welded to opposite walls of the receptacle, and latch rods 27 mounted on a cross channel bar 28 welded to the underside of the cover adjacent the opening 19.

As best shown in Fig. 7, the latch rods 27 are mounted on the bar 28 to slide in eyes 29 secured to opposite ends of the bar, so that the outer ends of the rods can be moved beneath the upper flanges of the bars 26 to latch the cover to the receptacle. The means for moving the rods may comprise a lever 30 fulcrumed on the bar 28 as at 31, and the inner ends of the rods 27 pivoted to the lever on opposite sides of the fulcrum, so that by turning the lever in one direction the two latch rods will be moved beneath the bar flanges, to lock the cover, and by turning it in the other direction the rods will be drawn from beneath the bar flanges to release the cover.

The door D controlling the opening 19 through which access is had for manually actuating the lever 30 to latch the cover to the receptacle, may be constructed of a metal plate 32 having angle bars 33 welded to its four edges in such manner that they provide grooves 34 on their under sides in which beads or rods 35 secured to the marginal edges of the opening 19, are received when the door is in closed position, as shown to advantage in Fig. 5. Thus the bars 33 coact with the rods and the cover to provide closed joints around all edges of the door to prevent the entrance of water, snow, and dust into the receptacle.

That bar 33 along the rear edge of the plate 32, is welded to alternate sleeves 36 of a hinge K, the other sleeves 36a being welded to the cover. Through all of the sleeves a pintle 37 extends to pivotally mount the sleeves 36 and thus hingedly mount the door on the cover. The door is provided with a pivoted handle 38 for lowering and raising the door, and for locking the door in closed position its forward edge has welded thereto a hasp 39 which may be secured to a staple 40 by a padlock 41.

To reinforce the cover C around the edges of the opening 19, and to provide supports for a pair of rollers 42, three channel bars 43, 44, and 45, are welded to the underside of the cover and to the bar 28 in a square arrangement (see Fig. 4). Ears 46 are welded to the bars 28 and 44, and suitable openings are formed in the bar 45, the two providing mountings for the rollers 42. These rollers are positioned to opposite sides of and above the reel E, and against which the hose H can non-frictionally bear as it is unwound from or wound onto the reel.

In the practice of the aforedescribed form of my invention, the cover C is detachably secured to the top of the receptacle by applying the bolts 24 and the nuts 25, and then extending the hand through the opening 19 and actuating the lever 30 to move the rods 27 into latching engagement with the keeper bars 26. Thus once the door D is closed and locked, access to the latch rods can no longer be had, and although the bolts 24 are still accessible, their removal would not release the cover for removal, and thus the cover remains locked on the receptacle to prevent surreptitious access to the refueling apparatus in the receptacle.

When authorized access to the receptacle is required for the purpose of inspection, repair or substitution of the apparatus parts, the cover can be removed by removing the padlock 41, opening the door, and then releasing the latching means so that upon removal of the bolts 24, the cover is free to be removed. However, in normal use of the apparatus the hose H need be only extended from the cover for refueling aircraft, and this can be done by merely opening the door. The door being relatively light as against the heavy cover, the comparative physical effort required to open the door is negligible.

Referring now to the form of my invention shown in Figures 8, 9, and 10, the same construction of receptacle R, cover C, and door D as in the first form of my invention is employed, the only difference being in the construction and mode of operation of the means for detachably securing the cover to the receptacle.

In the instant case this means comprises two angle members 47 welded to one inner wall of the receptacle adjacent the top thereof, with bolts 48 extending through the lower flanges of the bars 43 and 45, and provided with nuts 49 (see Fig. 10) which can be applied and removed through the opening 19 when the door D is in open position. On that wall of the receptacle opposite the wall to which the angle members 47 are secured, and on the under side of the cover C adjacent that cover edge confronting the aforesaid receptacle wall, are at least two latching devices. Each device may comprise a horizontal keeper lug 50 welded to the receptacle, and a latch bolt 51 welded to the cover and inclined downwardly at an angle of substantially 45 degrees to extend beneath and engage the lug so that when the cover is held against horizontal movement, the bolt will coact with the lug to secure the cover against upward movement.

The bolts 49 as applied to the cover serve to secure the latter against horizontal movement in any direction so that the bolts 51 are held in engagement with the lugs 50 and the cover thus secured against removal from the receptacle. The cover can be removed, however, by first removing the bolts, and then because of the inclination of the latch bolts the cover can now be lifted until the channel bars secured to its underside clear the upper edge of the receptacle when the cover can be slid off of the receptacle. Manifestly, to apply the cover to the receptacle the aforesaid operations are reversed.

Although I have herein shown and described only two forms of receptacles and closures therefor, and two forms of latching means for the closures, all embodying my invention, it is to be understood that various changes and modifications may be made therein without departing from the spirit of my invention and the spirit and scope of the appended claims.

I claim:

1. In an apparatus for refueling aircraft: a receptacle adapted to be positioned in a pit of a landing field; and a closure for said receptacle including a cover, a door in said cover, and means for detachably securing said cover to said receptacle, said means including fastening elements on the inner side of said cover and said reception, accessible through said door for immovably securing one edge of said cover on said receptacle, and latching members on the inner sides of said cover and said receptacle for latching the opposite edge of said cover to said receptacle, those members on said cover disengageable with those on said receptacle by movement of the cover, only when said elements are disengaged from said cover and said receptacle.

2. A closure for a pit receptacle for aircraft refueling apparatus, comprising a cover having an opening therein; rods secured to said cover and bounding the edges of said opening; a door for closing said opening; angle bars secured in inverted position on the edges of said door so as to overlay said rods when the door is closed; and a hinge having certain of its sleeves secured to said cover, and the others secured to one of said angle bars for hingedly mounting said door on said cover.

GERALD J. HARMAN.

REFERENCES CITED

The following references are of record in the file of this patent:

UNITED STATES PATENTS

| Number | Name | Date |
|---|---|---|
| 486,619 | Rossell et al | Nov. 22, 1892 |
| 1,009,842 | Jones | Nov. 28, 1911 |
| 1,497,248 | Searle | June 10, 1924 |
| 1,759,708 | Peter | May 20, 1930 |
| 1,868,497 | Griffith et al. | July 26, 1932 |
| 2,031,885 | Peter | Feb. 25, 1936 |
| 2,237,528 | Marasso | Apr. 8, 1941 |